Figure 1:
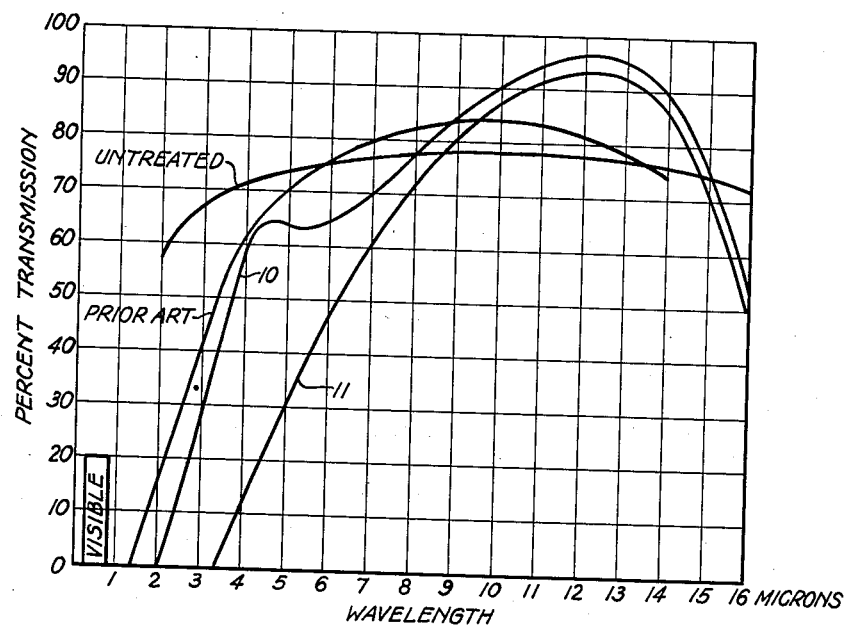

Nov. 13, 1962 G. W. HAMMAR ETAL 3,063,862
METHOD OF PRODUCING INFRARED TRANSMITTING FILTER
Filed Feb. 17, 1950

GUSTAF W. HAMMAR
FRANK C. BENNETT, JR.
INVENTORS

BY
ATTORNEYS

United States Patent Office 3,063,862
Patented Nov. 13, 1962

3,063,862
METHOD OF PRODUCING INFRARED TRANSMITTING FILTER
Gustaf W. Hammar and Frank C. Bennett, Jr., Rochester, N.Y., assignors to Eastman Kodak Company, Rochester, N.Y., a corporation of New Jersey
Filed Feb. 17, 1950, Ser. No. 144,812
8 Claims. (Cl. 117—33.3)

This is a continuation in part of our application, Serial Number 61,624, filed November 23, 1948, now abandoned.

This invention relates to infrared transmitting filters which absorb all visible radiation. It relates particularly to the silver chloride, silver sulfide type of filters such as described by H. C. Kremers and R. E. Price in U.S. Patent 2,420,956.

Filters of this type are, for all practical purposes, perfectly opaque through the visible region of the spectrum and out to 1.5 microns wave length. Such filters transmit about 84% of the light between 9 and 12 microns and less at other wave lengths in the infrared. It is one object of the present invention to extend the cut off point to 3 or even to 4 or 5 microns. It is a second object of the invention to provide a method of making such filters whereby the cut off point can be selected at will over a range of wave lengths between 2 and 5 microns.

It is a third object of the invention to provide a method of making such filters which will produce filters having a maximum transmission over 90% and even up to 95% at wave lengths around 12 microns.

The essential feature of the present invention consists in immersing a silver chloride sheet in a dilute aqueous solution of hydrogen sulfide for a few seconds and then rinsing the sheet in water. We have found that this provides a much more accurate and precise method of applying the silver sulfide layer to the chloride sheet. According to a preferred embodiment of the invention the sheet is then baked for at least 10 minutes, preferably for an hour or two, at a temperature between 175° C. and the softening point of the sheet which is about 455° C. This baking moves the cut off point from two microns out to longer wave lengths depending on the duration of the original immersion in hydrogen sulfide solution. For example, a sheet which has been immersed for 8 seconds in a 0.07 N solution will, after baking, have a cut off point at 3.5 microns, whereas if immersed for 10 seconds it will have a cut off point at 4 microns after baking. Roughly speaking a cut off point at wavelength L between 2 and 5 microns will result if a wettable clean silver chloride sheet is immersed $t$ seconds (where $t=4L-6$) in a solution with a concentration between 0.05 and 0.08 normal and is then baked for at least 10 minutes between 175° C. and 455° C.

In practice a sheet of single crystal or polycrystalline silver chloride is highly polished. The transparency thereof in the infrared between 5 and 15 microns is about 79 or 80%. The polished sheet is then cleaned by degreasing in a suitable organic solvent such as benzine, petroleum ether, naphtha, carbon tetrachloride, trichloroethylene, etc., and then dipping in hot concentrated nitric acid after which it is rinsed in water. This cleaning procedure is not an essential feature of the invention but is employed to insure uniformity of conditions and hence uniformity of results in producing a large number of filters.

Alternative methods of cleaning (e.g. by rinsing in a one or two percent solution or even stronger of ammonium hydroxide) which involve dissolving some of the silver chloride, require a reduction of the coating time (in hydrogen sulfide) because the etched surface of the silver chloride is more reactive. The clean sheet is then preferably dipped in a wetting agent such as a fatty alcohol sulfate. The various detergents commonly available on the market today have been found by us to be quite satisfactory for this purpose. There is nothing critical about which wetting agent is used. There does not appear to be anything which would normally be called a wetting agent and which would damage the silver chloride sheet but if there were, it must of course be avoided. Then, according to the invention, the sheet is transferred while still wet, to a solution of hydrogen sulfide, then after a few seconds it is rinsed and dried. The resulting filter is opaque out to 2 microns and this cut off point can be moved further into the infrared by baking at a temperature above 175° C. which is a transition point in the crystalline structure of silver sulfide.

The following procedures have been specifically used by us to produce filters opaque respectively to 3½ and 4 microns.

*Procedure A.*—The sheet of silver chloride, polished to a transmission of about 79% between 2 and 14 mu, is degreased in organic solvent (naphtha) and immersed in boiling nitric acid until clean. The sheet is then rinsed in water and immersed in a solution of a wetting agent, such as Aerosol O.T., or a fatty alcohol sulfate such as commonly sold for kitchen and laundry purposes. Following this the sheet is immersed with agitation in an 0.07 N solution of hydrogen sulfide for 8 seconds, rinsed in water and dried. The coating produced by this procedure has the following characteristics. It is practically opaque (definitely less than 1% transmission) in the visible and out to 2 mu in the infrared. It has a rapid increase in transmission to above 60% by 5 mu and it has a transmission in excess of 90% between 10 and 13 mu.

*Procedure B.*—This procedure is identical with Procedure A, except that the final dried sheet is baked in an inert atmosphere at 200° C. for one hour. Baking in air has been found to be satisfactory however. The opacity (less than 1% transmission) now extends into the infrared to a point beyond 3 microns but the transmission around 12 mu continues in excess of 90%.

*Procedure C.*—This procedure is identical with Procedure B except that the silver chloride sheet is immersed for 10 seconds in the 0.07 N solution of hydrogen sulfide; the coated sheet is baked at 200° C. for an hour. This produces a filter practically opaque to 4 mu and somewhat less transmission around 12 mu but still in excess of 85% between 11 and 13 mu.

The accompanying drawing (FIG. 1 and FIG. 2) shows the transmission curves for silver chloride, silver sulfide filters under various treatments.

In FIG. 1 the curve labelled "untreated" shows the transmission of a highly polished sheet of crystalline silver chloride. It is noted that the transmission never exceeds 79%. When such a sheet is exposed to hydrogen sulfide gas, or is dipped in ammonium sulfide for a few seconds, one obtains filters of various transmission characteristics the best of the known ones having transmission characteristics illustrated by the curve labelled "prior art" in FIG. 1. It will be noted that the cut off point for this filter is at 1.5 mu and the maximum transmission is about 84% at 10 mu. A filter according to one feature of the present invention, on the other hand, which has been treated with a wetting agent and then dipped in hydrogen sulfide solution gives a transmission shown by the curve 10. It will be noted that the cut off point has been moved by this simple expedient out to 2 mu and the transmission increases to about 60% at 4 microns. Although the transmission levels off slightly between 4 and 7 microns, it rises rapidly after 7 microns until it exceeds the transmission of the prior art filters and actually reaches about 95% at 12 mu. This curve 10 represents the filters made by Procedure A.

When such a filter is baked for an hour or two, at a temperature of 200° C. (i.e. Procedure B), the transmission, as shown by curve 11, moves further into the infrared so that the cut off point is now at 3.5 microns. However, the transmission still rises rapidly and exceeds 60% at about 7 microns and again reaches 94 or 95% at 12 microns.

Figure 2:
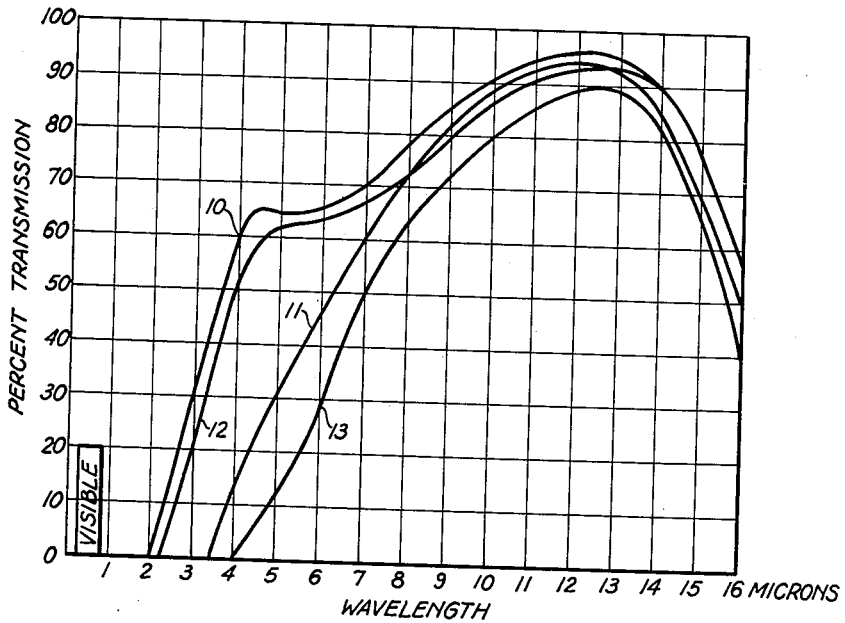

As shown in FIG. 2, this procedure allows precise control of the transmission characteristics. Curves 10 and 11 are repeated in FIG. 2. If the sheet is soaked for 10 seconds instead of 8 seconds in the hydrogen sulfide solution, the resulting transmission curve is that shown at 12, which differs only slightly from curve 10. However, after baking, the filter has the transmission characteristics shown by curve 13 which is considerably different from curve 11 especially since the cut off point has been moved out to 4 microns. Prior to the present invention it was not thought that filters of the silver chloride, silver sulfide type could be made having an opacity beyond 1.5 mu. The present invention not only moves the cut off point to 2, 3, or even 4 microns, but actually does it in a manner so that any desired value in this range and out to 5 microns may be elected. Also, the extremely surprising result of increased transmission is simultaneously obtained by the present invention. Of course, the maximum transmission does fall off slightly as the cut off point is moved from 3½ to 4 microns and further, but the change from the prior art cut off point of 1½ mu to 2 microns is not accompanied by any decrease in transmission, but actually provides a great increase. Furthermore, this gain in transmission at 12 microns is not lost even when the cut off point is moved out to 3½ mu. Therefore, one can move the cut off point even further out to 4 microns or beyond, and still not reduce the maximum transmission below the value obtained by the prior art.

Useful effects are obtained when the time of immersion in hydrogen sulfide solution has any value between 1 and 60 seconds, preferably between 2 and 15 seconds, when the sheet is pre-treated with a wetting agent to insure uniform rapid action of the sulfide. The shorter times such as 2 seconds are particularly desirable when the cleaning technique involves the use of $NH_4OH$. The wetting agent is employed to give an unbroken film of liquid across the surface before contact is made with the $H_2S$ solution. This is necessary in procedures A, B, and C but only if the filters to be produced are to be of uniform density. On the other hand, the wetting agent is less necessary when precleaning is done with dilute $NH_4OH$ solvents and may be dispensed with when uniformity of the filters is not critical. The baking temperature should be around 200° C., and definitely between 175° C. and 455° C. to obtain the above discussed shift of the cut off point to longer wavelengths. The final film may be protected by coating with a sufficiently heavy layer of a material that does not exhibit strong absorption at the wave length where the filter is to be employed, for example, polystyrene. The above discussed values of transmission are for silver sulfide coatings without any protective layer thereon. It is thought that optical interference may play a part in obtaining the high transmission around 12 microns.

The concentration of the $H_2S$ solution is not critical, but the times of immersion depend on the concentration and the above defined useful range of immersion times (2 to 60 seconds) is for concentrations between 0.05 normal to 0.08 normal; useful results can be obtained with concentrations between 0.01 normal and 0.2 normal without unreasonable immersion times being involved.

The above discussed procedures lend themselves directly to mass production, and large quantities of filters have been made thereby.

Having thus described the preferred embodiments of our invention, we point out that the invention is not limited to these specific examples.

What we claim and desire to secure by Letters Patent to the United States is:

1. The method of producing black filters which highly transmit infrared comprising immersing a clean polished sheet of crystalline silver chloride in an aqueous solution with a concentration between 0.01 and 0.2 normal, of hydrogen sulfide for between 2 and 60 seconds, rinsing the sheet in water and drying.

2. The method according to claim 1 including the additional step of baking the dried sheet for at least 10 minutes at a temperature between 175° C. and the softening point of the silver chloride sheet.

3. The method according to claim 1 including, immediately prior to said immersing in hydrogen sulfide solution, the step of immersing the clean polished sheet in a solution of a wetting agent.

4. The method of producing black filters which absorb all visible and infrared wave lengths shorter than 2 microns substantially completely and highly transmit wave lengths around 12 microns, comprising immersing a clean transparent polished sheet of crystalline silver chloride in a solution of a wetting agent, then immersing it in an aqueous solution with a concentration between 0.01 and 0.2 normal, of hydrogen sulfide for between 2 and 60 seconds, rinsing the sheet in water, and then baking it for at least 10 minutes at a temperature between 175° C. and the softening point of the silver chloride sheet.

5. The method according to claim 4 in which said immersing in hydrogen sulfide solution is continued for a time interval proportional to the wave length of the desired cut off point, below which all wave lengths are highly absorbed.

6. The method of producing black filters which highly transmit infrared comprising immersing a clean polished sheet of crystalline silver chloride in an aqueous solution, with a concentration between 0.01 and 0.2 normal, of hydrogen sulfide for between 2 and 60 seconds, rinsing the sheet in water, drying it and baking it for at least 10 minutes at a temperature of about 200° C.

7. The method of producing black filters which highly transmit infrared comprising immersing a wettable clean polished sheet of crystalline silver chloride in an aqueous solution, with a concentration between 0.01 and 0.2 normal, of hydrogen sulfide for between 2 and 60 seconds, rinsing the sheet in water, drying it and baking it for at least 10 minutes at a temperature between 175° C. and the softening point of the silver chloride sheet.

8. The method of producing black filters which highly transmit infrared above a cut off point at a wavelength L between 2 and 5 microns below which all wavelengths are highly absorbed, comprising immersing a wettable clean polished sheet of crystalline silver chloride in an aqueous solution with a concentration between 0.05 and 0.08 normal of hydrogen sulfide for $t$ seconds, where $t$ substantially equals $(4L-6)$, and baking the sheet at a temperature between 175° C. and the softening point of the sheet for at least 10 minutes.

References Cited in the file of this patent

UNITED STATES PATENTS

| | | |
|---|---|---|
| 2,420,956 | Kremers et al. | May 20, 1947 |
| 2,445,962 | Mell | July 27, 1948 |